INVENTORS:
FREDERICK KUNREUTHER
WILLIAM A. DICK
DOUGLAS C. HAUSCH
BY: *Oswald W. Wilmore*
THEIR ATTORNEY Aug. 25, 1964   F. KUNREUTHER ETAL   3,146,189
DISTRIBUTING VAPOR-LIQUID FEED TO BEDS
Filed Dec. 6, 1960   2 Sheets-Sheet 2
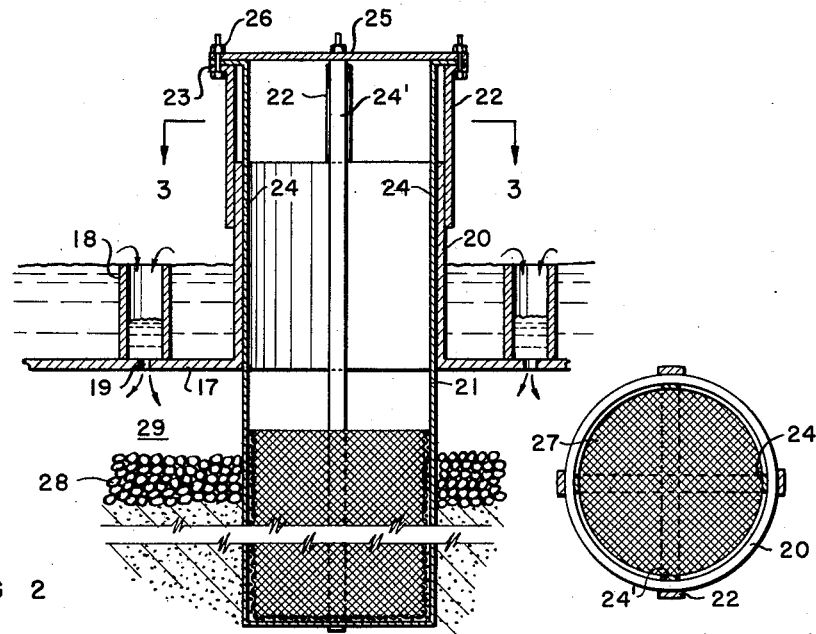
FIG 2
FIG. 3
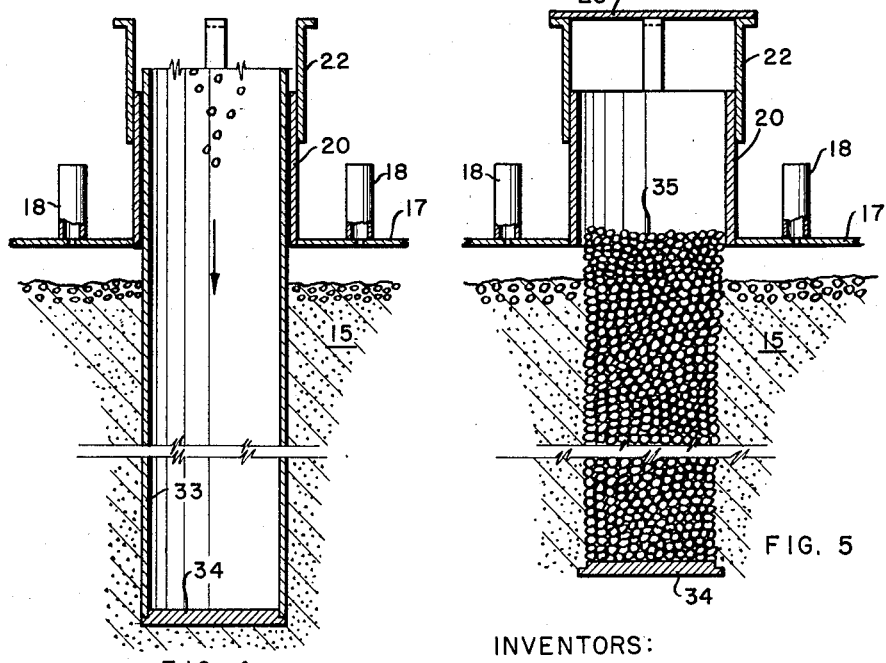
FIG. 4
FIG. 5
INVENTORS:
FREDERICK KUNREUTHER
WILLIAM A. DICK
DOUGLAS C. HAUSCH
BY: *Oswald H. Milmore*
THEIR ATTORNEY

United States Patent Office 3,146,189
Patented Aug. 25, 1964

3,146,189
DISTRIBUTING VAPOR-LIQUID FEED TO BEDS
Frederick Kunreuther, Scarsdale, William A. Dick, Briarcliff Manor, and Douglas C. Hausch, Scarsdale, N.Y., assignors to Shell Oil Company, New York, N.Y., a corporation of Delaware
Filed Dec. 6, 1960, Ser. No. 74,074
10 Claims. (Cl. 208—146)

The invention relates to the distribution of mixed phase feeds into fixed beds of particulate contacting material for downward flow therethrough. The term "mixed phase" is used herein for brevity to denote feeds which contain both a liquid component and a gaseous component (the latter being inclusive of vapors).

The distribution of mixed phase streams into such beds is encountered, for example, in the hydrodesulfurization of petroleum fractions, e.g., those boiling above the gasoline range. In such a process the particulate bed is composed of catalyst particles, such as alumina coated with cobalt and molybdenum oxide, and the feed stream includes liquid and vaporized hydrocarbon and hydrogen, which is flowed through the bed at elevated pressure, such as 200 to 2,000 lbs. per sq. in., and at elevated temperatures, such as 500–800° F. It is desirable in such cases to insure the intimate contact of the hydrogen with all hydrocarbon components, including the liquid components, while passing through the bed; this would not occur if the gas and liquid channelled, i.e., were segregated and flowed predominantly through separate zones of the bed. A seriously adverse consequence of channelling of liquid is the reduction in efficiency of catalyst utilization. Mixed phase feed are encountered also in other processes, such as when a gas is to be dissolved in a liquid, and it is evident that the contacting material may or may not be catalytic.

Completely homogeneous flow of the gaseous and liquid components through the bed is never attained, and the problem is that of distributing the phases to the bed so as to approach homogeneous flow as closely as possible without excessively costly distributing means. Two aspects of the problem may be noted, viz., that of distributing both the liquid and gaseous components uniformly over the bed area and that of insuring entry of these components into the bed in a manner which will result in flow which is most nearly homogeneous.

Uniform distribution of the gaseous and liquid components is difficult to achieve, particularly in beds of large diameters, such as four to six or more feet. Various distributing trays have been used; see, for example, the U.S. patent to Halik et al., No. 2,898,292. However, only approximate uniformity in distribution is achieved with known distributors which are economically feasible, due, for example, to practicably unavoidable deviations of the distributor tray from the horizontal and dynamic action of the fluids on the tray.

Further, uniform distribution of the components over the bed areas is a necessary but not a sufficient condition for close approach to homogeneous flow. It is also necessary to introduce the components uniformly into the bed. For example, distribution of the liquid and gas with perfect uniformity over the bed surface would not insure entry of these components uniformly over the bed; instead, one or the other enters preferentially at different local regions in what appears to be a random way.

Fouling of the bed surface by any cause, such as entry of pipe scale and other extraneous matter entering the vessel with the feed, aggravates maldistribution and leads to an increase in pressure drop through the bed.

It is the object of the invention to provide an improved method and apparatus for distributing mixed phase feeds fixed beds of particulate contacting material so as to achieve a better distribution of the feed components while they flow concurrently through the bed.

A further object is to improve the degree of uniformity with which the components of the mixed phase feed stream are distributed over the bed area. A more specific object is to improve the regulation of the passes of the liquid feed component from the distributor onto the bed in a manner to decrease and maldistribution of liquid caused by such disturbing influences as deviation of the distributor from the horizontal and dynamic action of the fluids on the distributor.

Still another object is to mitigate the increase in pressure drop through the bed due to fouling and to reduce the maldistribution of fluids entering the bed which would result from such fouling.

In summary, according to the invention the liquid and gaseous components are separately distributed over the bed area (being first at least partially separated from one another when they are introduced in a single feed stream in admixture with one another) and are separately introduced, the liquid from flowing as a plurality of streams from a liquid pool onto the top surface of the bed and at least a part of the gas being introduced by lateral flow from gas passages which extend downwards into the bed. In the preferred embodiment another part of the gas is admitted over the top surface of the bed and enters the bed downwardly from the upper surface thereof. According to another feature, distribution of liquid from the pool is made more uniform by flowing each of the liquid streams through a separate overflow tube having at a lower part thereof a flow-restriction which is dimensioned in relation to the flow rate so that a column of liquid is maintained within each tube above the restriction and below the pool.

By operating in accordance with the invention it was found that improved distribution and more effective use of the contacting bed is achieved despite variations in the flow rates and in the gas to liquid ratio, both of which are subject to considerable variations, and the life of the bed between shut-downs for cleaning is extended.

The introduction of gas into the downwardly extending gas passages and thence laterally into the bed insures that gas enters all regions of the bed, thereby effecting at least good initial gas distribution within the bed. Further, because only liquid enters the bed from the top it is better distributed within the bed over the full area thereof. It will be understood that complete uniformity of liquid is not attained at the extreme top layer of the bed, but that more liquid enters directly beneath the supply points at which liquid is fed from the distributor; however, the liquid spreads in trickling through the bed to attain a close approach to uniformity, and this spreading is not impeded by the presence of vertical gas currents at the extreme top layer.

Further, fouling of the bed is reduced and less deleterious: the liquid pool acts as a sedimentation basin for entrained material, whereby such material is for the greater part prevented from entering the bed, while the extended area afforded by the downward passages for the entry of gas prolongs the operating period before the obstruction to facile entry of the gas becomes so great to cause maldistribution and/or excessive pressure drop.

To be effective in prolonging the operating life of the bed and to prevent unduly high gas velocities, which would lead to channelling, it is desirable that the gas passages within the bed provide an aggregate side area which is at least equal to the horizontal cross-sectional area of the bed and, preferably, at least twice that. On the other hand, to insure concurrent downflow of the gaseous and liquid components through the bed, the gas passages should be located entirely within the upper half of the bed, preferably within the upper quarter thereof.

The integrity of the gas passages is maintained by suitable screening means which prevent lateral encroachment of the particulate contacting material while affording gas-flow channels vertically through the passages and laterally into the bed over most and, preferably, all of the surfaces of the passages. Such channels are larger than those between the bed particles. In one embodiment the screening means are foraminous walls, e.g., wire screen baskets. In another embodiment the screening means comprises of particulate material, such as spherical pellets of inert material larger in diameter than the contacting particles to provide a multiude of gas-flow channels presenting a comparatively low flow resistance.

The invention will be further described with reference to the accompanying drawings showing certain preferred embodiments, wherein:

FIGURE 2 is an enlarged detail view of a part of the distributor;

FIGURE 3 is a transverse section on the line 3—3 of FIGURE 2; and

FIGURES 4 and 5 are fragmentary views of a modified embodiment using spherical pellets as the screening means, the former showing the means for emplacing the pellets and the latter pellets in place.

Figure 1:
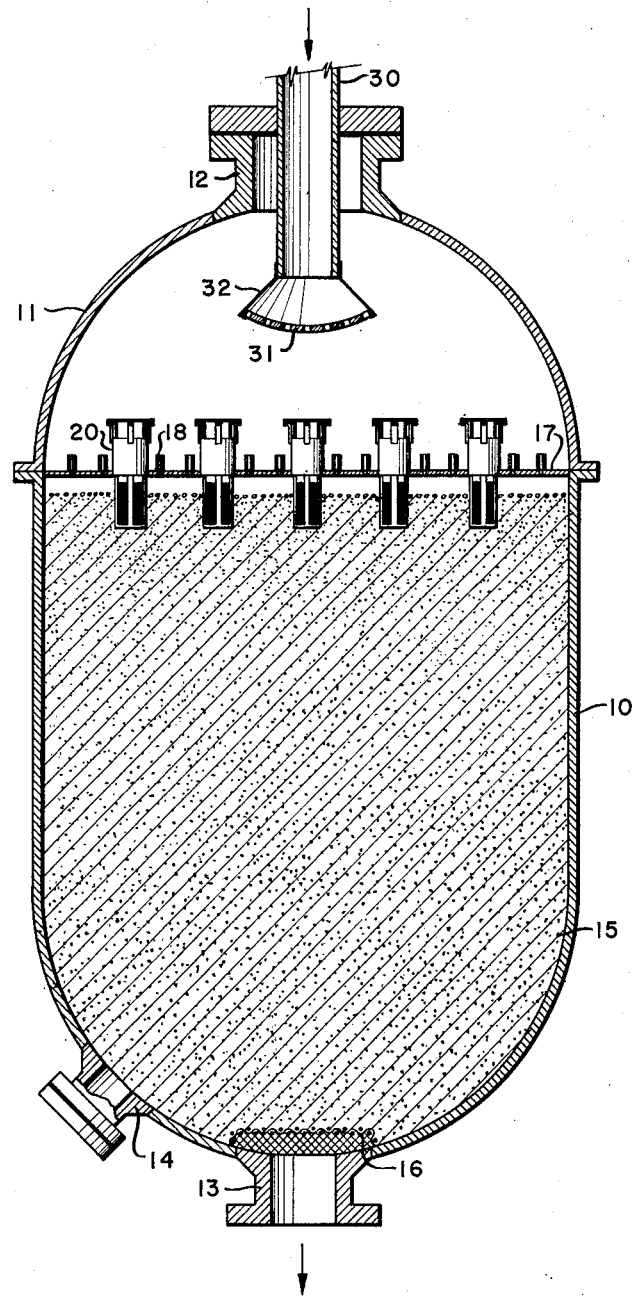
FIGURE 1 is a vertical sectional view through a contacting apparatus according to the invention.

Referring to FIGURES 1–3, the contacting apparatus or reactor comprises a vessel 10 closed by a dome 11 and fitted with an inlet nozzle 12 and outlet nozzle 13. A normally closed manway 14 may be provided. Between the inlet and outlet is a bed of particulate contacting material 15 retained by a foraminous support 16, such as a screen. Spaced above the upper surface of the bed is a distributor plate 17 which extends over the full cross sectional area of the vessel and is adapted to accumulate a pool of liquid thereon to a level determined by the upper edges of overflow tubes 18 which are distributed over the plate. The plate 17 has an orifice 19 situated within each overflow tube, the said orifice being smaller than the tube to form a flow restriction. The tubes 18 are located to achieve uniform distribution of liquid onto the bed area. The plate further has a plurality of chimneys 20 extending to above the tops of the tubes 18 and mounted at apertures 21 in the plate to constitute gas ducts. These are distributed over the plate area to effect uniform distribution of gas.

As is shown more particularly in FIGURES 2 and 3, each chimney carries several, such as four, straps 22 welded thereto and carrying an annular support 23. Resting on this support are the out-turned tips at the upper ends of a plurality, e.g., two generally U-shaped hangers 24, 24', which are retained by a cover plate 25. The latter is fastened to the support 23 by bolts 26. It is evident that gas can enter the chimney laterally between the straps 22. The hangers support a screen basket 27 beneath each chimney. The tops of the baskets may extend to and even into the chimney but in the preferred embodiment they are spaced beneath the plate 17 about 1–3 inches. These baskets project downwardly into the bed 15 to define therein gas passages from which the gas enters the bed laterally and, in the embodiment shown, also downwardly. Typically, the baskets may be 5¾ in. in diameter and project about 20–30 inches into the contact bed. Optionally the top of the bed may be covered by a thin layer, e.g., one to three inches thick, of ceramic balls 28 which should, however, be spaced beneath the plate 17 to leave a void space 29. It may be noted that although the placement of the baskets directly beneath their respective chimneys is preferred because it facilitates installation and improves separation of entrained solids, it is not essential to operability as far as attaining distribution is concerned.

The inlet nozzle contains a supply pipe 30 which is advantageously provided with suitable means to spread the feed entering the vessel and thereby reduce the flow velocity. Thus, it may be fitted with a perforated, downwardly convex baffle plate 31 held in spaced relation to the end of the pipe by straps 32. This baffle may further aid in effecting a separation between the gas and liquid components, in that the liquid is largely collected by impingement on the baffle and drains through the openings therein. However, the principal function is to spread out the entering stream and thereby reduce turbulence on the plate 17 which would detract from the uniform distribution of liquid thereon and from its efficiency as a liquid distributor and as a scale separator.

In operation, the mixed phase feed supplied through the supply pipe 30 is spread over the cross section of the vessel by the baffle 31. The liquid component of the feed is collected on the plate 17 to form a pool being prevented by the covers 25 from falling into the chimneys 20; only minor amounts of liquid may be carried into these chimneys by entrainment with the gas, which enters the chimneys laterally between the straps 22. The gas and liquid are thus separated principally by low-velocity flow toward the distributor plate and by the plate itself, although this may be supplemented by the action of the baffle 31. The liquid rises until it overflows the several tubes 18, from which it drains through the restricted orifices 19 onto the beds. When the layer of balls 28 is provided they serve to prevent displacement of contact particles at the top of the bed; the liquid in this case trickles through these balls.

The plate 17 serves to reduce or prevent entry of entrained solids to the bed with the liquid in that it acts as a sedimentation basin from which liquid overflows into the tubes 18. Further, the restrictions are such that a column of liquid L is retained within each tube; this tends to equalize the liquid flow rates when the overflows are more or less equal. It is evident that sedimentation and equal overflows are detrimentally affected by turbulence on the tray.

The gas, essentially free from liquid, flows through the chimneys 20 and enters the bed as two streams: One part flows downwards into the baskets 27 from which it enters the bed through an extended area, both laterally and downwards from the bottom. The other part flows through the space 29 and enters the bed downwardly. (It may be noted that the latter flow would occur even if the basket were extended to the plate 17.) Entrained solid matter preferentially enters the baskets and is collected at the bottom, so that less fouling matter enters the bed. However, enry of such matter is not wholly prevented and the extended entry area prolongs the useful life of the bed.

The liquid and gas become commingled within the bed and flow through it with reduced channelling.

FIGURES 4 and 5 show a modified arrangement wherein columns of inert bodies, such as ceramic balls, are used in lieu of wire baskets as the screening means to maintain the integrity of the downwardly extending gas passages. FIGURE 4 shows how the balls are emplaced. A tube 33 is inserted through the chimney 20 while the bed 15 is being emplaced; this tube may optionally have a base plate 34, although in most instances this plate may be omitted. When the bed 15 has been completed to the desired level the bodies 35 are introduced through the tube 33 and the latter is withdrawn. The plate 25 is then attached, as shown in FIGURE 5. The bodies 35 are larger than the particles of the bed 15 or of such shape as to provide low-resistance flow passages which are larger than the passages within the bed.

Operation of the arrangement according to FIGURE 5 is like that previously described.

It may be noted that the sizes of the orifices 19 may be different. Thus, they are formed by drilling the plate 17 to achieve uniform distribution of liquid.

We claim as our invention:

1. Method of distributing a mixed phase feed uniformly over the cross-section of a contacting bed which comprises the steps of introducing a mixed phase feed comprising a gaseous component and a liquid component into a vessel at a level above a stationary bed of particulate contact material which is confined within said vessel, disengaging at least the predominant part of said liquid component from the gaseous component, collecting the liquid as a pool spaced above the top of the bed, flowing liquid from said pool downwardly onto the upper surface of said bed as a plurality of liquid streams which are distributed over the area of the bed, flowing the distributed liquid downward through the bed, and introducing the gaseous component into the bed by flowing at least a part thereof laterally from gas passages that extend downwardly from the top of the bed entirely within the upper half of the bed for intimate contact with the liquid flowing through the bed.

2. Method according to claim 1 wherein the flows of said liquid stream are regulated by flowing liquid by gravity from said pool into a plurality of downward flow passages which have restrictions and are wider than said restrictions at their upper levels, the flow rate being such that a column of liquid is maintained within each said passages above the restriction and below the level of said liquid pool.

3. Method of distributing a mixed phase feed mixture uniformly over the cross-section of a contacting bed which comprises the steps of introducing a mixed phase feed containing a gaseous and a liquid component in admixture with one another into a vessel at a level above a stationary bed of particulate contacting material which is confined within said vessel, disengaging at least the predominant part of said liquid component from the gaseous component, collecting the disengaged liquid as a pool spaced above the top of the bed, flowing liquid from said pool downwardly onto the upper bed surface as a plurality of liquid streams which are distributed over the area of the bed, regulating the flows of said liquid streams from the liquid pool by restricting each of said streams, flowing the distributed liquid downwardly through said bed, flowing the residual gaseous component downwards through said pool in isolation from the disengaged liquid, and introducing said gaseous components into said bed as two parts by flowing a first part thereof laterally beneath said pool and above said bed and thence downwardly into the bed through the upper surface thereof and flowing another part into gas passages which extend downwardly into the bed from the upper surface thereof entirely within the upper half of the bed and are distributed over the bed area and thence laterally into the bed for intimate contact with the liquid flowing through the bed.

4. Apparatus for distributing a mixed phase feed comprising a gaseous and a liquid component uniformly into a bed for flow therethrough which comprises: a closed vessel including a feed inlet for introducing said feed to an upper part of the vessel and an outlet and containing therebetween a stationary bed of particulate contacting material providing fine flow channels, said bed having a plurality of gas passages that extend downwardly from the top of the bed entirely within the upper half of the bed; screening means for maintaining said gas passages against lateral encroachment by the contacting material, said means providing flow a channel larger than the said flow channels in the bed for the flow of gaseous components through the gas passages and laterally into the bed over extended areas; a liquid distributor vertically spaced above said bed and beneath said inlet and constructed and arranged to accumulate a pool of liquid from said inlet and to distribute liquid over the bed surface; and a plurality of gas ducts open at their tops at a level above said pool and in communication with said gas passages within the bed, said gas ducts being distributed to conduct gaseous components to said gas passages from the space above the distributor in isolation from said liquid.

5. In combination with the apparatus defined in claim 4, a baffle mounted above each said gas duct, said baffles being constructed and arranged to prevent liquid from falling into the duct while permitting gaseous components to enter the duct by lateral flow beneath the baffle.

6. Apparatus as defined in claim 4 wherein said liquid distributor includes a transverse plate, a plurality of tubes extending upwards from the plate, and flow restriction means in a lower part of each overflow tube, for regulating the flow rates of liquid through the several tubes, said tubes being distributed over the area of said bed.

7. Apparatus as defined in claim 4 wherein said screening means are wire-screen baskets enclosing an empty channel for the flow of said gaseous components.

8. Apparatus as defined in claim 4 wherein said screening means are solid bodies having diameters larger than the particulate contacting material providing a multiplicity of channels for the flow of said gaseous components.

9. In combination with the apparatus defined in claim 4, baffle means within the vessel above said distributor situated opposite the said inlet for spreading the feed introduced through the said inlet.

10. Apparatus as defined in claim 4 wherein said gas passages within the bed and said screening means are situated respectively beneath gas ducts and the lower ends of said gas ducts are further in flow communication with the space between said distributor and the top of the bed for flow of a part of the gaseous component laterally through said space and thence downwards into the bed.

References Cited in the file of this patent

UNITED STATES PATENTS

| | | |
|---|---|---|
| 2,342,080 | Kalichevsky | Feb. 15, 1944 |
| 2,707,163 | Thibaut | Apr. 26, 1955 |
| 2,981,677 | Bowles | Apr. 25, 1961 |
| 3,006,740 | Maggio | Oct. 31, 1961 |